July 12, 1960  K. O. LARSON  2,944,799
CEMENT MIXER

Filed Aug. 7, 1958  3 Sheets-Sheet 1

INVENTOR.
KARL O. LARSON
BY
Merchant & Merchant
ATTORNEYS

July 12, 1960 K. O. LARSON 2,944,799
CEMENT MIXER

Filed Aug. 7, 1958 3 Sheets-Sheet 2

INVENTOR.
KARL O. LARSON
BY
*Merchant & Merchant*
ATTORNEYS

July 12, 1960 — K. O. LARSON — 2,944,799
CEMENT MIXER
Filed Aug. 7, 1958 — 3 Sheets-Sheet 3
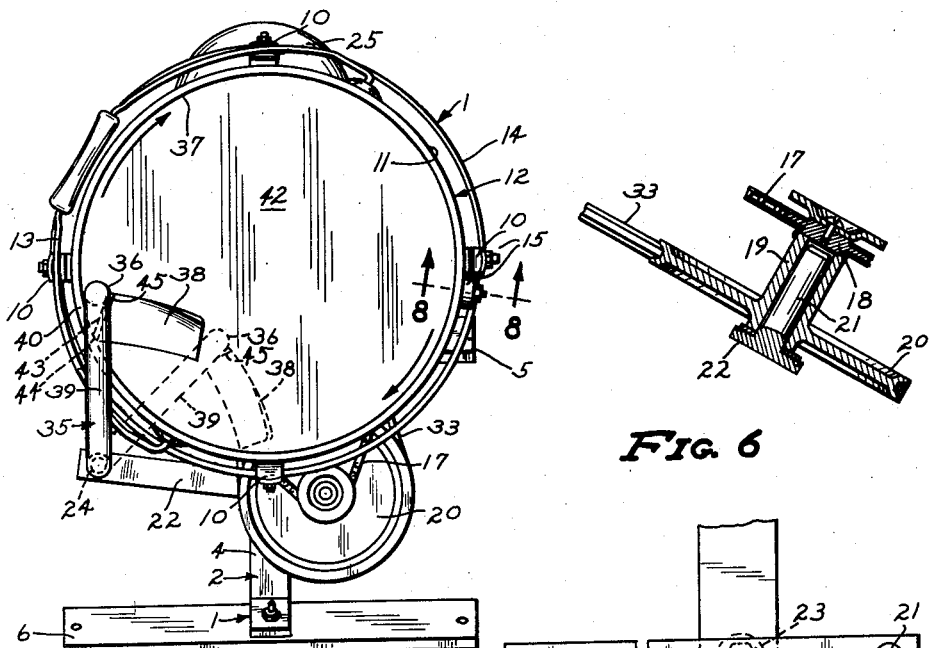
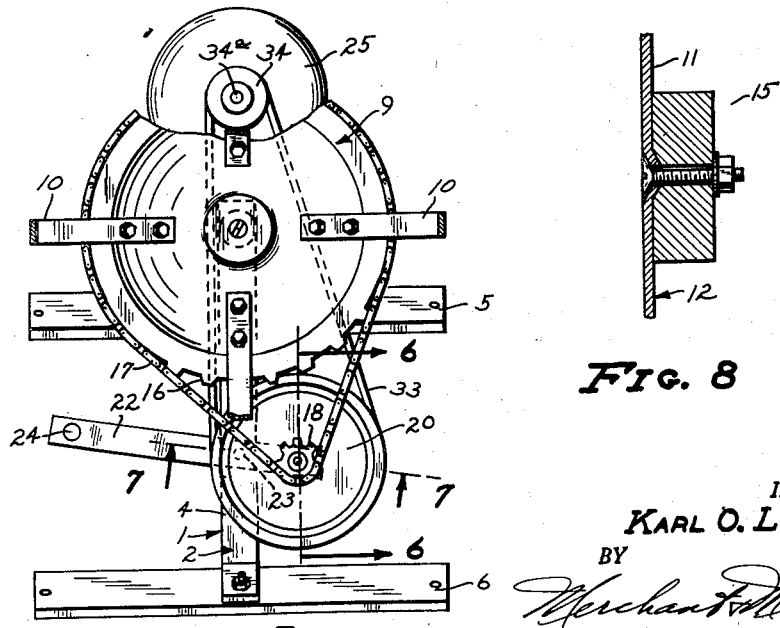
INVENTOR.
KARL O. LARSON
BY
Merchant & Merchant
ATTORNEYS United States Patent Office 2,944,799
Patented July 12, 1960

2,944,799
CEMENT MIXER
Karl O. Larson, 2323 Ellis Ave., St. Paul 14, Minn.
Filed Aug. 7, 1958, Ser. No. 753,664
5 Claims. (Cl. 259—177)

My invention relates generally to machines for mixing granular or pulverulent materials and more particularly to devices for making concrete by the admixing of Portland cement or the like with aggregates and water.

More particularly my invention relates to relatively small devices of the character immediately above described and has for its primary object the provision of a power operated mixing device for concrete and the like which may be lifted and readily transported by a single person and which may be stored and shipped in a minimum of space.

A further object of my invention is the provision of a device of the class immediately above described which incorporates a conventional bale handle-equipped drum, such as a five gallon drum, and in which the motor and mounting frame components may be readily assembled and disassembled for effective use or alternatively for complete containment within the drum for the purpose of storage and transportation.

A further object of my invention is the provision of a device of the class described which may be assembled and disassembled and operated with a minimum of skill, which has a minimum or working parts, and which is rugged and durable in construction.

A further object of my invention is the provision of a device of the class above described which is relatively inexpensive to produce and operate and which is extremely efficient in its operation.

A still further object of my invention is the provision of a device of the class above described including a source of power such as an electric motor and driving belts associated therewith, wherein novel means is provided for maintaining said belts in a taut driving relationship under conditions which would normally render said belts inoperative due to vibration and loosening of the attachments between the component parts of the supporting frame structure.

The above and still further objects of my invention will become apparent from the following detailed specification, appended claims and attached drawings.

Referring to the drawings wherein like characters indicate like parts throughout the several views:

Fig. 4 is a view in plan as seen from the line 4—4 of Fig. 3;

Fig. 5 is a view partly in section and partly in plan as seen from the line 5—5 of Fig. 3, with the mixing bucket removed;

Fig. 6 is an enlarged fragmentary section taken substantially on the line 6—6 of Fig. 5;

Fig. 7 is an enlarged fragmentary detail in side elevation as seen from the line 7—7 of Fig. 5, some parts being broken away; and Fig. 8 is an enlarged fragmentary section taken on the line 8—8 of Fig. 4.

Figure 1:
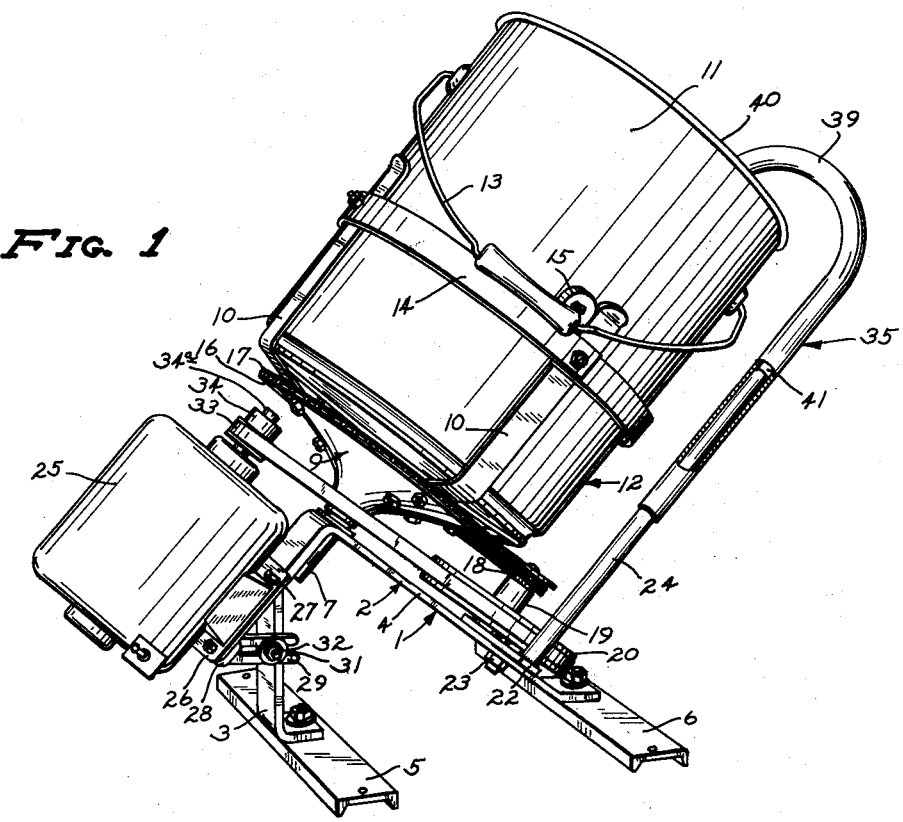
Fig. 1 is a perspective view of my novel structure in its assembled form.
Figure 2:
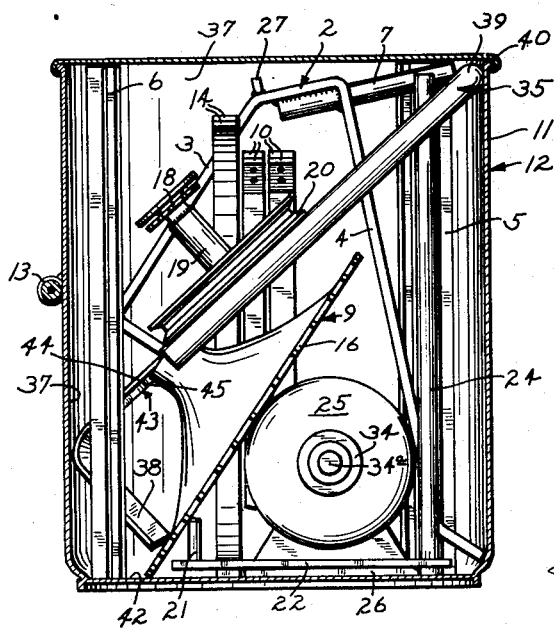
Fig. 2 is a view in vertical axial section of the mixing drum of my novel structure showing the component parts thereof stored therewithin.

Referring with greater particularity to the drawings, the numeral 1 indicates in its entirey a take-apart supporting frame structure including an upstanding supporting leg 2, shown as comprising a vertical leg element 3 and an integrally formed inclined leg element 4. Frame structure 1 also includes horizontally disposed feet 5 and 6 detachably secured to the lower end portions respectively of the leg elements 3, 4. Secured to the supporting frame structure 1 and projecting generally upwardly from the upper end portion of the inclined leg element 4 thereof and normal to the longitudinal plane of said inclined leg element 4 is a spindle 7. The spindle 7 is receivable within a downwardly opening axial socket 8 of a turntable 9. Thus the turntable 9 is mounted for rotation about an axis that is obliquely inclined with respect to the horizontal. The turntable 9 has circumferentially spaced generally upwardly directed marginal edge portions 10 adapted to engage the circumferentially spaced portions of the side wall 11 of a conventional cylindrical mixing drum 12. The mixing drum 12 is of a conventional type such as the five gallon drums used for the shipment of paint and other liquid material and is provided with a handle-equipped bale 13 to facilitate transportation thereof.

Preferably, the upper ends of the marginal edge portions 10 to the turntable 9 are tied together by an annular band 14. To positively insure common rotation of the mixing drum 12 with the turntable 9 when said drum is concentrically seated on the turntable 9 as shown particularly in Figs. 1 and 3, I secure to the outer side wall of the drum 11, as shown particularly in Figs. 4 and 8, a radially outwardly projecting lug 15 which under relative rotation of the drum 12 with respect to the turntable 9 engages one of the circumferentially spaced marginal edge portions 10.

Figure 3:
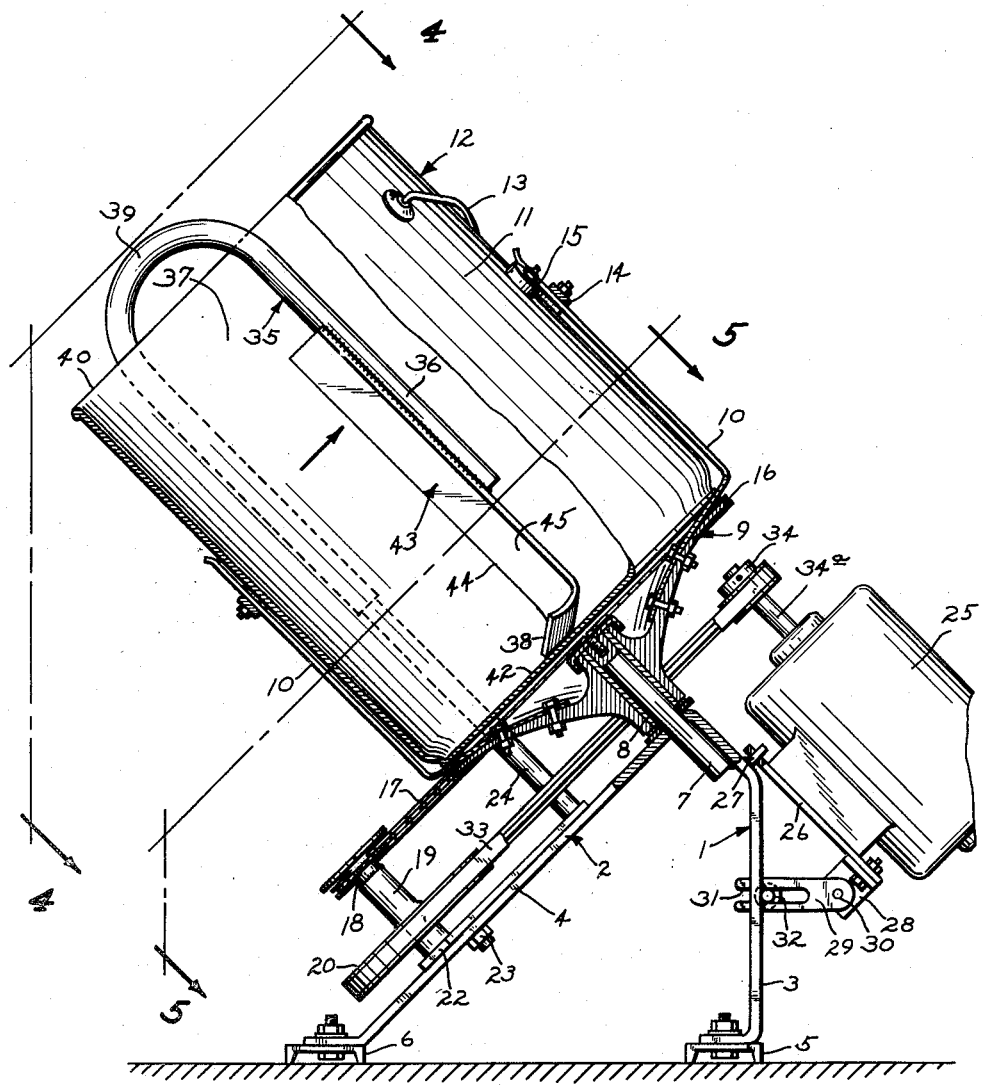
Fig. 3 is a view in side elevation of my novel structure, some parts being broken away and some parts shown in section.

Rigidly secured to and forming a part of the turntable 9 is a large sprocket 16, over which is entrained a link belt or chain 17. The chain 17 is likewise entrained over a small drive sprocket 18, which as shown in Fig. 6 is fast on and concentric with one end of a tubular hub 19 shown as being formed integrally with a relatively large driven V-pulley 20. The V-pulley 20 and its hub 19, as shown particularly in Figs. 3 and 6, are slidably rotatably received over a generally upstanding spindle 21, shown as being formed fast on one end of a lever 22. The intermediate portion of the lever 22 is pivotally secured, as indicated at 23, to the intermediate portion of the inclined leg element 4; whereas the opposite extended end thereof is provided with an upstanding mixing arm mounting rod 24, which as shown extends generally upwardly on an axis parallel to the axis of rotation of the turntable 9 and drum 12 and in laterally outwardly spaced relationship to the wall 11 of said drum 12.

A motor 25, shown as being of the conventional electric type, is provided with a rigid base plate 26. One end of the base plate 26 is apertured for the reception of a mounting pin 27 fast on the upper end of the vertical leg element 3; whereas the opposite end of the mounting plate 26 is provided with a depending mounting bracket 28. A link 29 is pivotally secured at one end, as at 30, to the mounting bracket 28, whereas the slotted opposite end 31 thereof adjustably receives, as shown particularly in Fig. 3, a clamping screw 32 rigidly carried by and projecting laterally from the intermediate portion of the vertical leg element 3. This arrangement facilitates attachment, detachment and adjustment of a V-belt 33 entrained over the driven V-pulley 20 and a V-drive pulley 34 fast on the extended end of a drive shaft 34a of the motor 25.

A mixing arm, identified in its entirety by the numeral 35, is shown as comprising an elongated intermediate portion 36 extending generally parallel to the axis of the drum 12 and turntable 9 and adapted to have scraping engagement with the inner surface 37 of the drum 12, a bottom angularly disposed portion 38 which is generally radially inwardly directed with respect to the mixing drum when the mixing arm 35 is in scraping engagement with the cylindrical wall of the drum, as shown particularly in Fig. 4, and an angularly outwardly disposed upper end portion 39 which overlies the upper edge 40 of the mixing drum 12 in spaced relationship thereto.

At its radially outwardly extended end, the angularly disposed upper end portion 39 of the mixing arm 35 is downturned in parallel relationship to the intermediate portion 36 thereof and, as shown particularly in Fig. 1, is provided with a downwardly opening socket 41 for the reception of the extended upper end of the arm mounting rod 24. It will be noted that the socket 41 is of sufficient depth to permit the angularly disposed lower end portion 38 of the mixing arm 35 to engage the bottom 42 of the drum 12 under the action of gravity. Furthermore, the freedom of movement of the mixing arm 35 established by the socket 41 and rod 24 permits swinging movements of the mixing arm 35 within the drum 12 as rotary movements are imparted to the turntable 9. As indicated by the arrows in Figs. 3 and 4, clockwise movements of the turntable 9 and drum 12 will cause the intermediate portion 36 of the mixing arm 35 to engage the inner surface 37 of the cylindrical wall 11 of the drum 12 due to engagement of the mixing batch within the drum 12 therewith.

As shown particularly in Figs. 3 and 4, the intermediate portion 36 of the mixing arm 35 comprises a longitudinally elongated blade portion 43 which is adapted to be positioned with one longitudinal edge 44 thereof in scraping engagement with the inner surface 37 of the drum wall 11 when by engagement thereof with the mixing mass said arm 35 is caused to assume the full line position of Fig. 4. It will be there noted that the side surface 45 of the blade 43 diverges inwardly from said edge with respect to the adjacent portion of the drum wall 11, whereby to generally radially inwardly deflect intercepted batch ingredients rotated with the drum 12. Thus, due to the combined actions of the blade 43 which deflects batch ingredients toward the axis of the drum 12, and the angularly disposed lower end portion 38 of the arm 35 which deflects batch ingredients out of engagement with the bottom 42 of the drum 12, a thorough admixture of the batch ingredients is insured.

At this point, it is important to point out that the novel relationship above described and particularly the mounting of the drive sprocket or pulley 18 on one end of the intermediate pivoted lever 22 and the mixing arm 35 on the opposite end portion of the lever 22 (through the rod 24) tends to maintain the link belt 17 in a normally taut adjusted operative condition. It is understood, of course, that the tension of the link belt 17 is normally preadjusted by pivotal positioning of the lever 22 on the anchor bolt 23 and is set in that position by tightening of the nut on said anchor bolt 23. However, it will be further seen that the driving tension on one side of the link belt 17 will tend to rotate the lever 22 in a position to loosen the belt and that if this action were not countered, this action might ultimately cause displacement of the sprocket to a position wherein the link belt 17 would no longer function efficiently or would be displaced from the cooperating sprockets entirely; this being particularly true in case the operator had failed to fully tighten the nut on the anchor bolt. This tendency is overcome by the drag of the batch of ingredients on the mixing arm 35 which is transferred to the other end of the lever 22, thereby counterbalancing or offsetting the belt loosening tendency before described.

My invention has been thoroughly tested and found to be completely satisfactory for the accomplishment of the above objects and while I have shown a preferred embodiment thereof, I wish it to be understood that same is capable of modification without departure from the scope and spirit of the appended claims.

What I claim is:

1. In a mixing machine, a supporting frame structure, an open-topped mixing drum mounted for rotation on the frame structure about a generally upwardly and downwardly directed axis, a lever intermediately pivotally connected to the supporting frame structure on an axis parallel to but laterally offset from the drum axis and having end portions extending in generally opposite directions from said pivot, a drum-driving pulley concentric with the drum, a cooperating pulley journalled on one extended end of said lever, a belt running over said pulleys, and a mixing arm extending into the drum through the open top thereof for engagement with mixed ingredients rotating with the drum, and means for mounting said mixing arm, said means comprising structure extending from the upper end of the arm and mounted on the other extended end portion of said lever, and means for driving the lever mounted pulley, the driving tension on one side of said belt tending to swing the lever and lever mounted pulley in a direction to loosen the belt, and the drag on said mixing arm by rotating batch ingredients tending to rotate the lever and lever mounted pulley in the opposite direction to tighten the belt.

2. The structure defined in claim 1 in which the pulley driving means comprises a motor mounted on the frame structure, a pulley mounted on the motor shaft, a cooperating pulley concentric with respect to and in driving engagement with the before-said lever mounted pulley, and a belt running over said cooperating pulleys.

3. In a mixing machine, a supporting frame structure, a turntable mounted on the frame structure for rotation about a generally upwardly and downwardly directed axis, a generally cylindrical open-topped mixing drum seated on the turntable with freedom for upward displacement therefrom and for rotation therewith, a mixing arm extending downwardly through the open top of the mixing drum for engagement with mixed ingredients rotating with the drum, a lever pivotally mounted intermediate its ends on the frame structure for swinging movements about an axis laterally offset from but parallel to the axis of the turntable and drum, a pulley concentric to and fixed with respect to the turntable, concentric pulleys journalled on one extended end portion of said intermediately pivoted lever, a belt running over one of the last said pulleys and the turntable pulley, a motor-driven belt entrained over the other of said pulleys, and means for mounting said mixing arm, said mounting means comprising structure extending from the upper end portion of said mixing arm to the other extended end portion of said lever, the last said structure defining a combination pivotal and telescopic connection between said lever and said mixing arm whose axis is laterally outwardly offset from the turntable and drum but parallel thereto, the mixing arm being swingable within the drum on said axis toward and from the generally cylindrical wall of the drum and the telescopic pivotal connection being upwardly displaceable by sliding action to permit removal of the arm, tension on one side of the turntable driving pulley tending to rotate the lever pivotally in a direction to loosen said belt and the drag of batch ingredients on the mixing arm tending to rotate the lever in an opposite direction to thereby tighten said belt.

4. In a mixing machine, a supporting frame structure, a power-driven turntable mounted on said supporting frame structure for rotation on a generally upwardly directed axis, a generally cylindrical open-topped mixing drum seated on said turntable and freely removable therefrom, a mixing blade support fixed on said supporting frame structure and having a portion extending substantially parallel to the axis of the drum and outwardly spaced from said drum, a mixer blade freely movable axially and radially relatively to said drum to engage the interior thereof and having a portion extending laterally away from the drum and downwardly substantially parallel to the axis of said drum, said last-mentioned portion being freely slidable and rotatably mounted on said mixing blade support, said mixing blade having a lower portion extending generally radially inwardly of the drum and resting on the bottom thereof.

5. The structure of claim 4, wherein the mixing blade engageable with the interior of the drum has a surface which diverges from the surface of the drum whereby pressure of a batch causes the blade to press against the surface of the drum.

References Cited in the file of this patent

UNITED STATES PATENTS

| | | |
|---|---|---|
| 414,632 | Crail | Nov. 5, 1889 |
| 1,027,172 | Bigelow | May 21, 1912 |
| 2,075,851 | Johnston | Apr. 6, 1937 |
| 2,099,964 | Robbins | Nov. 23, 1937 |
| 2,599,852 | McClain | June 10, 1952 |
| 2,633,140 | Wagner | Mar. 31, 1953 |
| 2,808,241 | Beran | Oct. 1, 1957 |